(12) United States Patent  
Seibt

(10) Patent No.: US 9,096,315 B2  
(45) Date of Patent: Aug. 4, 2015

(54) APPARATUS FOR RECOVERING KINETIC ENERGY RELEASED DURING LANDING OF AN AIRCRAFT AFTER CONTACT WITH THE GROUND, AND METHOD

(75) Inventor: Christian Seibt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 138 days.

(21) Appl. No.: 13/602,491

(22) Filed: Sep. 4, 2012

(65) Prior Publication Data

US 2013/0087654 A1 Apr. 11, 2013

Related U.S. Application Data

(60) Provisional application No. 61/529,939, filed on Sep. 1, 2011.

(30) Foreign Application Priority Data

Sep. 1, 2011 (DE) .......................... 10 2011 082 029

(51) Int. Cl.
*B64C 25/32* (2006.01)
*B60T 1/10* (2006.01)
(Continued)

(52) U.S. Cl.
CPC . *B64C 25/32* (2013.01); *B60T 1/10* (2013.01); *B64C 25/405* (2013.01); *B64D 41/00* (2013.01); *F04D 25/04* (2013.01); *H02J 7/14* (2013.01); *B60K 7/00* (2013.01); *B60K 2007/0038* (2013.01); *B60K 2007/0092* (2013.01); *B60W30/18127* (2013.01); *Y02T 50/53* (2013.01); *Y02T 50/823* (2013.01)

(58) Field of Classification Search
USPC ........................ 244/103 R, 110 R, 111, 110 A
See application file for complete search history.

(56) References Cited

U.S. PATENT DOCUMENTS 4,290,268 A * 9/1981 Lowther .......................... 60/668  
5,088,662 A * 2/1992 Appleberry ................... 244/111  
(Continued)

FOREIGN PATENT DOCUMENTS

DE 19600910 6/1996  
DE 10 2008 031 933 4/2010  
(Continued)

OTHER PUBLICATIONS

European Search Report, Dec. 13, 2012.

*Primary Examiner* — Timothy D Collins  
*Assistant Examiner* — Jamie S Stehle  
(74) *Attorney, Agent, or Firm* — Greer, Burns & Crain Ltd.

(57) ABSTRACT

An apparatus for recovering kinetic energy released during and aircraft landing after ground contact, for ground and/or flight operation, comprising at least one energy converter for conversion of the kinetic energy into another energy form, where the energy converter is located in the area of the nose landing gear and/or in the area of the main landing gear of the aircraft. At least one energy storage system is provided for receiving and releasing at least a part of the converted kinetic energy. The apparatus has a high degree of multiple utilization and enables, for example, maneuvering of a landed aircraft on the taxiway independently of the engines, where the aircraft is substantially moved with the braking energy recovered during the landing process. Since the main engines are no longer required for maneuvering, there is a considerable potential for saving energy and the use of motor-operated tow vehicles is eliminated.

9 Claims, 3 Drawing Sheets

(51) Int. Cl.
  *B64C 25/40*  (2006.01)
  *F04D 25/04*  (2006.01)
  *H02J 7/14*  (2006.01)
  *B64D 41/00*  (2006.01)
  B60K 7/00  (2006.01)
  B60W 30/18  (2012.01)

(56) References Cited

U.S. PATENT DOCUMENTS 6,450,448 B1  9/2002  Suzuki
7,870,727 B2  1/2011  Mueller et al.
8,136,761 B2 *  3/2012  Kiyosawa ............... 244/103 R
2005/0224642 A1  10/2005  Sullivan
2008/0258014 A1  10/2008  McCoskey et al.
2010/0170981 A1  7/2010  Belleville
2011/0127828 A1  6/2011  Sorin et al.

FOREIGN PATENT DOCUMENTS

DE    10 2009 026 982    3/2011
GB             2 460 132   11/2009
WO              8000237    2/1980
WO              9815755    4/1998
WO       WO 2009/125213   10/2009

* cited by examiner

APPARATUS FOR RECOVERING KINETIC ENERGY RELEASED DURING LANDING OF AN AIRCRAFT AFTER CONTACT WITH THE GROUND, AND METHOD

CROSS-REFERENCES TO RELATED APPLICATIONS

This application claims priority to German Patent Application No. 10 2011 082 029.9 filed Sep. 1, 2011 and claims the benefit of U.S. Provisional Application No. 61/529,939 filed Sep. 1, 2011, the entire contents of each of which are hereby incorporated by reference.

BACKGROUND OF THE INVENTION

The invention relates to an apparatus for recovering the kinetic energy released during landing of an aircraft after contact with the ground, for ground and/or flight operation, comprising at least one energy converter for conversion of the kinetic energy into another energy form, where the energy converter is located in the area of the nose landing gear and/or in the area of the main landing gear of the aircraft.

In addition, the invention has as its subject matter a method for recovering the kinetic energy released during landing of an aircraft after contact with the ground for ground and/or flight operation.

In present-day aircraft, the kinetic energy released during the landing and subsequent braking process on the taxiway is converted by means of a braking system into heat of friction, where the thermal energy can no longer be used for other processes. The braking process is usually assisted by the aircraft engines being switched to reverse thrust during the braking process, which requires the use of additional energy which in the same way is lost for further energy use.

After the landing process, an aircraft nowadays is normally moved in the forward direction merely with the aid of the thrust of the main engines (so-called "taxiing"). Here the main engines are idling, that is operating far below the optimal operating state in view of the efficiency. A controlled backwards movement of an aircraft, for example, pushing back from the terminal (so-called "push-back") must however be accomplished with motorized tow vehicles since the aircraft engines only deliver a pure forward thrust in regular operation.

The function of the pneumatic and electrical installations or systems of an aircraft in ground operation when the main engines are at a standstill is usually maintained by means of a so-called "Auxiliary Power Unit" (APU). An APU comprises a small gas turbine which is used to provide pneumatic and/or electrical energy for the onboard supply of the aircraft and which has a significantly reduced power compared to the main engines. The APU is usually located in the tail area of the aircraft fuselage. Starting the aircraft engines has also been accomplished hitherto by means of the pneumatic energy provided by the APU. In flight operation the necessary pneumatic, hydraulic and electrical energy is generated by means of the main engines. In ground operation the pneumatic and electrical energy is predominantly generated by means of the APU. The generated energy is required, inter alia, for maintaining the pressure in the aircraft cabin, the air-conditioning system, the anti-icing system, the de-icing system, tank pressurization, hydraulics, fresh water supply and other aircraft systems.

The emergency power supply during achieved with rechargeable batteries flight is nowadays and a so-called "Ram Air Turbine" (RAT). The "Ram Air Turbine" can, for example, be pivoted out on the underside from a wing or the aircraft fuselage. Consequently in an emergency situation ambient air flows onto the "Ram Air Turbine". Electrical energy is generated by an electrical generator integrated in the "Ram Air Turbine" which is connected mechanically to an air screw of the "Ram Air Turbine".

Further known from the prior art are landing gear systems for aircraft in which, for example an electric motor is integrated in the nose landing gear in order to enable maneuvering or rolling of the aircraft on the taxiway completely independently of the main engines and/or motorized tow vehicles. The electrical energy required to operate the electric motor is in turn taken from an APU. Aircraft fitted with such a system for rolling independent of the engines can achieve a considerable reduction in kerosene consumption compared with conventional aircraft which can only be maneuvered on the taxiway by means of the main engines or tow vehicles. Furthermore, motorized tow vehicles can be dispensed with, giving a considerable saving in costs, materials and staff.

SUMMARY OF THE INVENTION

It is an object of the invention inter alia to further improve the overall efficiency of an aircraft and enable a cost-effective and reduced-emission operation of the system components of the aircraft and furthermore to effective use the recovered energies in the flight and ground phases of the aircraft.

Since at least one energy storage system is provided for receiving and releasing at least a part of the converted kinetic energy, the kinetic energy to be dissipated during the landing of an aircraft in the course of the braking process can be at least partially accumulated in the energy storage system. The energy accumulated in the energy storage system can easily be retrieved again when required and for example enables the aircraft to maneuver on the taxiway independently of the engines. The attainable overall efficiency of the apparatus according to the invention for recovering braking energy lies in a range between about 15% and 75%. For an assumed overall efficiency of 25%, an aircraft weight of, for example, about 40 t and a touchdown speed of typically 67 m/s, after the braking process if the aircraft an amount of energy of about 7 kWh is already available for moving or maneuvering the aircraft on the taxiway.

An electrical tow vehicle such as, for example that having the type designation "F110 Elektrik" from Schopf achieves in comparison a tensile force of 95 kW with a continuous power of 60 kW at a peak power of 76 kW. This tow vehicle is suitable for small or medium aircraft up to a total weight of 150 t and could, for example, be operated by the amount of energy specified further above of about 7 kWh for up to about 5 minutes.

As a result of the amount of energy recovered by means of the apparatus during landing, the use of the main engines and the use of motorized tow vehicles for moving the aircraft on the taxiway can be dispensed with. As a result, an aircraft fitted with an apparatus according to the invention can also land at airports having little infrastructure. These aspects result in an appreciable saving of energy, material and staff costs. The apparatus is primarily operated with the braking energy recovered during the landing process of the aircraft. Depending on the specific operating conditions, it can however be necessary to supply additional energy from outside, for example, in the form of chemical energy bound in a fuel, pneumatic energy (compressed air) and/or electrical energy. The energy can be coupled in for example by supply kerosene or by means of the APU which generates electrical and/or pneumatic energy.

The energy storage system is preferably charged by means of at least one generator energy converter which transforms the braking energy into an energy form suitable for storage. The energy accumulated in the energy storage system after the completion of the landing process can be used, for example, for maneuvering the aircraft on a taxiway independently of engines. For this purpose, another motor energy converter should usually be provided which converts the energy stored in the energy storage system back into kinetic energy. The at least two energy converters are preferably arranged in the nose landing gear and/or main landing gear of the aircraft and coupled mechanically either directly or indirectly via a torque converter (transmission) to the wheels of the nose landing gear and/or main landing gear. For example, a generator energy converter and a motor energy converter can each be mechanically coupled directly or indirectly via a torque converter (transmission) to one wheel of a double wheel of the nose landing gear and/or main landing gear. Alternatively both energy converters can be located in the aircraft fuselage which however assumes a suitable mechanical force transmission or coupling, as loss free as possible, between the wheels of the landing gear and the energy converters. Alternatively a single energy converter can be provided which can be switched between generator or motor operation. An example for such an energy converter with two operating modes is an electric motor which can produce power in the generator mode in addition to pure motor operation. The same applies to an air motor or an optionally multistage air turbine which can be driven both by means of compressed air and can also generate compressed air by means of the supply of mechanical energy. An essential purpose of the apparatus is to provide a "green" and economical technology which helps to minimize pollution and noise at airports and to reduce fuel consumption.

According to an advantageous further development of the apparatus, it is provided that the energy storage system is formed with at least one compressed air container.

A compressed air container enables effective storage of the kinetic energy accumulating during the braking of an aircraft in the form of highly compressed air with a low weight at the same time and a high storage system efficiency. A medium which reduces the combustibility and flammability can be introduced into the compressed air container. The medium should be introduced at the lowest possible pressure, where the medium must have a higher pressure than the current container pressure. In addition, an energy storage system in the form of a compressed air container has a low self-discharge and achieve a high cycle strength which leads to an almost unlimited lifetime. The compressed air container having a preferably spherical or substantially cylindrical shape can, for example, be fabricated with a high-strength carbonfibre-reinforced plastic material. As a result, the compressed air container can permanently withstand a high internal pressure. Unlike a compressed air container, other designs of storage system can also be used such as, for example, electric rechargeable batteries, flywheels, chemical storage systems, thermal storage systems or the like for the intermediate storage of the kinetic energy to be dissipated or the braking energy of the aircraft.

A further development of the apparatus provides that the at least one energy converter is formed with at least one air compressor.

By means of the air compressor, which is coupled mechanically for example to at least one wheel of the nose landing gear and/or main landing gear, the kinetic energy of the aircraft is transformed into compressed air which is collected in the energy storage system. For this purpose the air compressor is connected by means of an air line to the compressed air container. Depending on the storage system technology used, other energy converters such as, for example, an electric generator can be used. The air compressor can be achieved with a continuous-flow machine, for example, a multistage air turbine or with a piston machine. For intermit tent increase in the braking action, additional braking systems may be required, such as for example disk brakes on the landing gear and/or a reverse thrust device on the main engines. The apparatus additionally reduces the wear on these conventional braking systems possibly still required since these only need to convert a reduced fraction of the braking energy into thermal energy.

According to a further advantageous embodiment of the apparatus it is provided that at least one further energy converter is formed with at least one air motor and/or with at least one air turbine.

The air motor or the air turbine enable a continued movement of the landed aircraft on the taxiway independent of the engines. For operation of the air motor the compressed air stored in the energy storage system is fed via a compressed air line to the compressed air motor which drives at least one wheel of the nose landing gear and/or main landing gear via an optional torque converter (transmission) An air motor is usually designed as a piston engine whereas an air turbine is configured as a (multistage) continuous-flow machine.

According to a further development of the apparatus, it is provided that at least one heat exchanger is disposed between the air compressor and the compressed air container.

The heat exchanger on the cool the air which has one hand makes it possible to been severely heated by the compression process, which can reach a temperature of up to 1,000° C. On the other hand, via the heat exchanger the heat of compression produced can be made available for other system components of the aircraft such as for example the cargo hold, the bilge, de-icing systems or the like.

In a further development of the apparatus, at least one fuel mixing chamber is disposed between the compressed air container and the air motor and/or the air turbine.

Due to the fuel mixing chamber, the compressed air held in the energy storage system can be mixed with a fuel, for example, with kerosene or with a combustible gas, on entry into the air turbine and the mixture can then be ignited. The hot exhaust gases produced drive the air turbine, where at the same time icing of the air motor or the air turbine as a result of the expansion-dependent cooling of the compressed air flowing from the energy storage system and the freezing of any residual amounts of air moisture can be avoided.

A further advantageous embodiment provides that at least one thermal storage system is provided.

The thermal storage system makes it possible to store a larger amount of heat and additionally release the same in a staggered manner. In addition, a large amount of heat can be made available to the system component of the aircraft by means of the thermal storage system in a short time.

According to a further advantageous embodiment of the apparatus, it is provided that located downstream of the fuel mixing chamber is a drive unit which drives an electrical generator.

By this means it is possible to provide electrical energy in flight and/or ground operation of the aircraft. The drive unit can comprise a flow turbine such as, for example, a lowpower gas turbine or a piston machine.

According to a further embodiment of the apparatus, an electrical generator is connected directly to the air motor and/or the air turbine.

This makes it possible to provide electrical energy without the need for an additional drive unit.

A further embodiment provides that the energy storage system is formed with at least one electrical rechargeable battery.

By this means, the electrical energy accumulating during the braking of the aircraft can be stored in electrical form in a simple manner.

According to a further embodiments, the at least one energy converter is formed with at least one electrical generator.

Due to the electrical generator, the accumulating braking energy can be converted into electrical energy with a high efficiency. The electrical generator is here driven via at least one wheel of the nose landing gear and/or main landing gear of the aircraft either directly or indirectly via a torque converter (transmission). The energy produced by the electrical generator is led off through a flexible cable which is connected to the energy storage system which in this variant comprises an electrical rechargeable battery.

A further advantageous embodiment provides that at least one further energy converter is formed with at least one electric motor.

By this means the braking energy of the aircraft stored in the electrical rechargeable battery can be converted with a high efficiency back into kinetic energy which enables continued movement of the aircraft on the taxiway independent of the engines. By means of the electric motor the wheels of the nose landing gear and/or main landing gear of the aircraft are driven directly or indirectly via a torque converter (transmission).

According to a further development of the apparatus, the energy storage system can be filled via a storage system interface in ground operation.

By this means the energy storage system can if required easily and rapidly be refilled with pneumatic energy or with electrical energy via a compatible ground interface. The continued movement of the aircraft from the airport terminal to the runway can fundamentally be ensured conventionally and always with the main engines and/or with tow vehicles without the need for a ground supply via the storage system interface. The energy management system can always ensure a residual capacity for the process of pushing back from the terminal (s-called "push-back") as well as the starting process of the main engines—even if an APU is optionally not present. However, the storage system interface of the ground station additionally enables the energy storage system to be "charged" for particular cases of application or if the system according to the invention could not be charged by the landing, for example due to successive poor weather conditions such as, for example iced runways or the like.

Furthermore, the object according to the invention is solved by a method according to patent claim 14 having the following steps:

a) at least partially converting the kinetic energy into another form of energy, b) storing the converted kinetic energy in an energy storage system and c) controlled release of the energy collected in the energy storage system for ground and/or flight operation of the aircraft, in particular for maneuvering the aircraft on the ground.

In process step a) the kinetic energy or the braking energy of the aircraft is converted into another suitable form of energy for storage. For example, the kinetic energy can be converted into electrical energy or into pneumatic energy (compressed air). The kinetic energy converted to such an extent is collected in an energy storage system in process step b) The energy accumulated and held in the energy storage system is then released in a controlled and staggered fashion for different purposes in process step c). For example, the energy held in the energy storage system can be used for maneuvering the aircraft on the taxiway independently of the engines. The control or monitoring of the energy generation, energy storage and energy release from the energy storage system is preferably accomplished by means of an energy management system inside the apparatus, not described here in detail, which in turn is connected to the flight computers from the information technology aspect, i.e., exchanges a plurality of information with these.

DETAILED DESCRIPTION OF THE PREFERRED EMBODIMENTS

Figure 1:
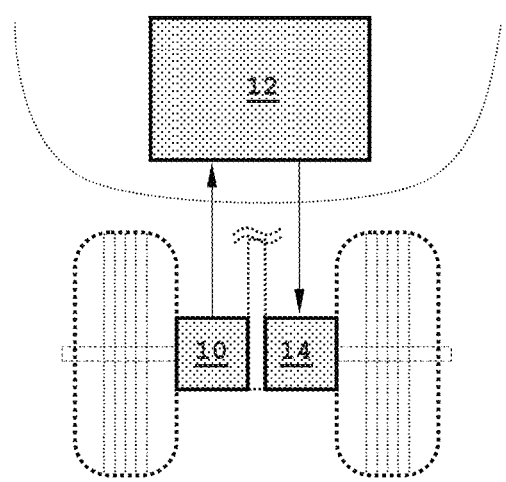
FIG. 1 shows a schematic view of a base variant of the apparatus according to the invention.

In the drawings the same constructive elements each have the same reference numbers. The direction of the energy flows and the relevant connecting lines are each indicated symbolically by the directional black arrows.

FIG. 1 shows a fundamental embodiment of an apparatus with an indicated double wheel of a noise landing gear.

An air compressor 10 or compressor is used as an energy converter and is either mechanically connected directly or indirectly via a torque converter (transmission) to a wheel, indicated by a dotted line, of a double wheel of a nose landing gear and/or main landing gear of an aircraft not provided with reference numbers. If the wheels of the landing gear after touchdown of the aircraft on the runway have sufficient ground adhesion, at least one wheel of the nose the rotational energy of landing gear and/or main landing gear can be converted into compressed air with the aid of the air compressor 10. The compressed air is guided via a line not shown into a compressed air container 12, which here as an example functions as an energy storage system. The compressed air container 12 is built into the aircraft at a suitable point, in particular in a region of little relevance for safety and can, for example, be formed with a high-strength, carbon-fibre reinforced plastic material that allows an air pressure of up to 800 bar in the compressed air container 12. In principle, a plurality of installation regions in the aircraft fuselage are suitable for integration of the apparatus. In particular, the compressed air container 12 can, for example, be positioned inside the wings, behind the pressure bulkhead (non-pressurized region) or in so-called triangle regions. The arrangement of the compressed air container 12 in the ceiling area (e.g. above the inner lining of the passenger cabin) of the aircraft fuselage is a particularly preferred installation site here in view of safety aspects. The pneumatic connection between the air compressor 10, the compressed air container 12 and air motor 14 is accomplished by means of compressed air lines not shown or in the case of electrical energy converters such as, for example, electrical generators and electric motors, by electrical lead or cable.

After braking of the aircraft to a sufficiently low speed, the compressed air stored in the compressed air container 12 is passed via a line not shown to the air motor 14 or an air turbine which is used for maneuvering the aircraft on the taxiway. The travel of the aircraft on the taxiway or the monitoring of all the energy flows inside the apparatus is preferably accomplished under permanent monitoring by a flight computer or by a control and/or regulating device independent of this. The air motor 14 is likewise mechanically connected directly or indirectly via a torque converter (transmission) to another wheel of the double wheel. Both the air compressor 10 and also the air motor 14 or the air turbine can be connected via switchable couplings to the wheels of the nose landing gear and/or main landing gear so that they can be switched between generator and motor operation. Couplings can then be used if, instead of the air compressor 10 and the air motor 14, an electric motor or an electric generator is used as energy converter. With the aid of the air motor 14 the aircraft is maneuvered on the taxiway independently of the engines after completing the landing process. This results in a considerable saving of fuel since the main engines idling with only low efficiency are no longer required to move the aircraft on the taxiway. Furthermore, the use of motorized tow vehicles can be dispensed with.

Instead of the air compressor 10 and the air motor 14, for example an electric motor and an electric generator can each be used as energy converters. In such an arrangement an electrical rechargeable battery is required as energy storage system which for example, can be achieved with a nickel-metal-hydride rechargeable battery, a lithium rechargeable battery, a sodium-sulphur rechargeable battery or with a lithium-polymer rechargeable battery. Alternatively, for further simplification of the mechanical structure, an electric motor can be used which also allows generator operation.

Figure 2:
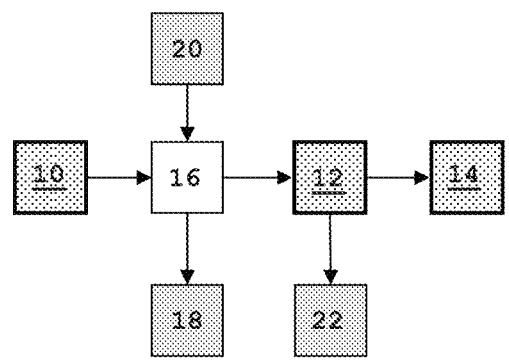
FIG. 2 shows a block diagram of a further development of the apparatus with a heat exchanger.

FIG. 2 illustrates a block diagram of a further development of the apparatus according to FIG. 1.

Unlike the embodiment according to FIG. 1, an optional heat exchanger 16 is connected between air compressor 10 and compressed air container 12. This is because as a result of the compression process in the air compressor 10, the air is very strongly heated and can reach a temperature of up to 1,000° C. Due to the heat exchanger 16, the air is cooled to such an extent that a higher degree of filling can be achieved in the compressed air container 12. In addition, the apparatus is protected from high temperatures and the overall efficiency increases considerably. In order to further minimize the losses, the compressed air container 12 can be encased with a thermal insulation. In addition, the heat removed by the heat exchanger 16 can be made available to other system components 18 of the aircraft, such as for example a cargo hold. In conjunction with a heat pump, the thermal energy coupled out from the heat exchanger 16 can also be used for cooling the passenger cabin. External air 20 (so-called "ram air") from the surrounding atmosphere is supplied for cooling down the heat exchanger 16. Furthermore the apparatus provides the option of delivering compressed air to other aircraft systems via a pneumatic interface 22. In this case the compressed air withdrawn from the compressed air container 12 via the interface 22 must be regulated according to the pressure level required to operate the other aircraft systems, where the other aircraft systems in flight operation are predominantly supplied by the main engines and in ground operation by a localized APU in the tail area of the aircraft fuselage. The system engineering connection of the APU usually located in the tail of the fuselage to the apparatus is accomplished by means of pneumatic and electrical lines.

Figure 3:
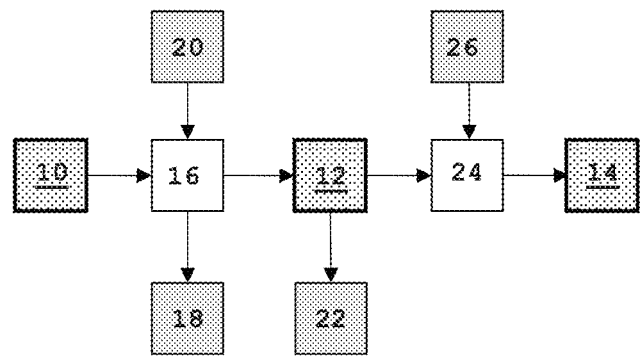
FIG. 3 shows a further embodiment of the apparatus with a fuel mixing chamber.

FIG. 3 illustrates another embodiment of the apparatus according to the invention. Unlike the embodiment according to FIG. 2, the apparatus according to FIG. 3 with otherwise identical structure—has a fuel mixing chamber 24 and an optional separate fuel tank 26.

During an "energy removal" from the compressed air container 12, the compressed air contained therein cools down rapidly due to expansion. This can have the result that the air motor 14 or the air turbine ice up as a result of technically unavoidable residual quantities of moisture. In order to avoid this effect, the compressed air withdrawn from the compressed air container 12, before being supplied to the air motor 14 or the air turbine is mixed in a fuel mixing chamber 24 with a suitable fuel such as for example kerosene or a combustible gas, and the mixture is ignited. The hot exhaust gases drive the air motor 14 or the air turbine and prevent these from icing up. If the air motor 14 for example is designed as a piston machine, the mixture can be ignited directly in the piston machine. The fuel tank 26 comprises an aircraft tank usually accommodated in the wings which also supplies the main engines or the APU with fuel. A separate fuel tank 26 is only required if the mixture is made with a fuel other than with the kerosene now usually used for operating aircraft. For example, hydrogen or natural gas are considered as alternative fuels.

Figure 4:
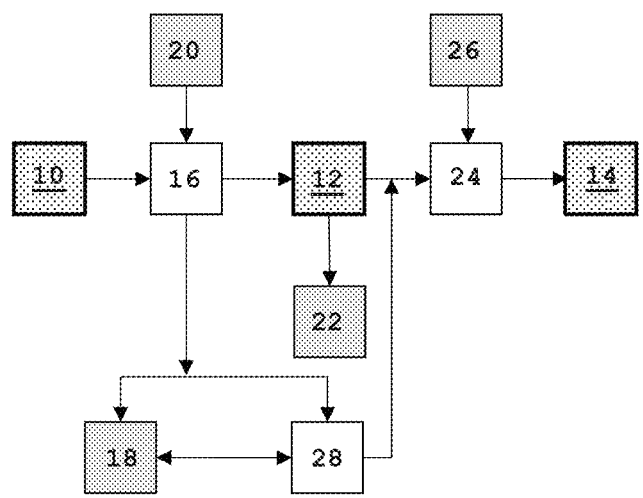
FIG. 4 shows a further development of the apparatus with thermal storage system.

FIG. 4 illustrates another embodiment of the apparatus which is extended by a thermal storage system 28.

The thermal storage system 28 is charged with thermal energy from the heat exchanger 16. At the same time the heat exchanger 16 can supply the system components 18 of the aircraft with thermal energy. With the aid of the thermal energy accumulated in the thermal storage system 28, the compressed air removed from the compressed air container 12 can be additionally preheated before it enters into the fuel mixing chamber 24. The efficiency of the following combustion process is thereby increased. Furthermore, the thermal storage system 28 can supply thermal energy to the system components 18 or absorb thermal energy directly from these (bidirectional coupling) In addition the thermal storage system 28 makes it possible to receive and store a larger quantity of thermal energy from the heat exchanger 16 which, if required, can be made available in the short term for other system components of the aircraft such as, for example, deicing apparatus, sanitary installations, onboard kitchens or the like.

Figure 5:
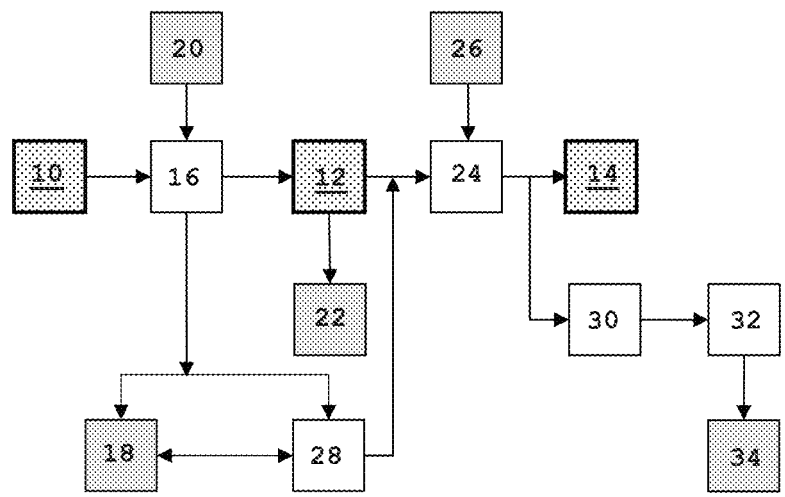
FIG. 5 shows a further variant of the apparatus with an additional drive unit with downstream electric generator and FIG. 6 shows another embodiment of the apparatus with an interface for a ground station (storage system interface).

FIG. 5 shows an apparatus according to FIG. 4 where this is supplemented by a drive unit 30 with a downstream electric generator 32 and an electric interface 34. The separate drive unit 30 is coupled mechanically to the electric generator 32 to generate electrical energy. The drive unit 30 can for example comprise a small gas turbine or a piston machine. The electric interface 34 is intended for feeding the electrical energy generated by the electric generator 32 into the electrical aircraft systems, not shown in detail, and/or a ground station. It is thereby possible to always provide a sufficient quantity of electrical energy in flight and/or ground operation of the aircraft. Alternatively, the generator 32 and the drive unit 30 can be replaced by a fuel cell (so-called hybrid system). In an alternative embodiment it is possible to couple the air motor 14 or the air turbine directly to the electric generator 32 and use this to generate electrical energy using compressed air from the compressed air container 12. The electrical and pneumatic energy required for operation of an aircraft is produced in current aircraft models by means of an APU. Consequently the drive unit 30 in conjunction with the electric generator 32 can take over its function so that an APU can be completely dispensed with and a significant reduction of emissions can be achieved in ground and/or flight operation. Conversely, both the drive unit 30 and the electric generator 32 coupled to this can be substituted by a conventional APU optionally provided in the aircraft. For this purpose the APU already integrated in the aircraft must be coupled pneumatically and electrically to the apparatus. Furthermore, compressed air from the compressed air container 12 can be used to increase the efficiency of the gas turbines usually used in conventional APUs. For this purpose the compressed air is preferably coupled into a higher compressor stage of the gas turbine inside the APU. In addition, the pneumatic energy held in readiness at the compressed air container 12 depending on the current pressure and temperature level can be used via the pneumatic interface 22 directly for driving a continuous flow machine such as, for example, a turbocharger which then in turn can drive an electric generator for power generation.

Figure 6:
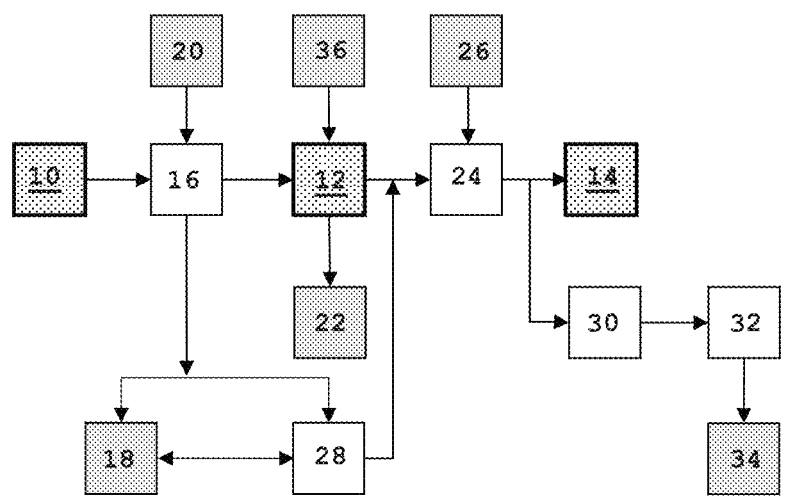

FIG. 6 shows the apparatus from FIG. 5 where this is modified by a storage system interface.

By means of the electric-pneumatic storage system interface 36, for example the compressed air container 12 can be filled or refilled if necessary with the aid of an external source during ground operation of the aircraft. This can be necessary for example if the compressed air container 12 has not been sufficiently filled by means of the energy recovery during the last landing of the aircraft. In this case, the compressed air container 12 can be partially or completely filled with compressed air via the storage system interface 36 at the ground station. This is preferably accomplished depending on the next planned aircraft deployment. The same applies accordingly for the case where the energy storage system is implemented with an electrical rechargeable battery or another storage system technology. An energy management system, not shown in detail here, is connected for this purpose to the flight computers of the aircraft and calculates the necessary degree of filling of the compressed air container 12.

The energy management system also regulates and distributes fully automatically all the energy flows within the apparatus, according to demand and efficiently. If the pneumatic energy held in readiness in the compressed air container 12 is not sufficient in flight operation, for example, compressed air generated by means of an additional electrical compressor can be fed via the storage system interface 36 into the apparatus. Alternatively, the required compressed air can be generated by means of at least one air compressor or compressor accommodated, for example in the nose landing gear or main landing gear or the fuselage, which is then actively driven by an appurtenant air motor or an air turbine. Accordingly the air compressor or the compressor can be driven by means of an electric motor. In the case of an electrical energy storage system, this can take the required electrical energy by means of the storage system interface 36 from the onboard power supply.

The apparatus according to the invention has an extraordinarily high degree of multiple utilization and along with many other possibilities for deployment and use, allows maneuvering of a landed aircraft on a taxiway independently of the engines.

Furthermore, the pressure energy stored inside the apparatus can be used for starting the main engines of the aircraft on the ground. The energy required for this is retrieved as required via the pneumatic interface 22 at the compressed air container 12.

The apparatus further enables the thermal energy released during compression in the air compressor 10 to be supplied to other aircraft systems and to provide heat to areas inside the aircraft which require heating. For example the cargo hold and the bilge of the aircraft can be temperature controlled in this way. Consequently, the icing-up of drainage valves in the area of the lower bilge can be prevented for example and associated weight and corrosion problems caused by undesirably entrained frozen condensation water can be avoided. The energetically expensive electrical heaters required otherwise are eliminated for the most part.

The compressed air held in readiness in the compressed air container 12 can also be used for inflating emergency chutes and/or for pumping up floats in the event of an emergency landing of the aircraft on water. In addition the apparatus has a low failure probability and can also be run rapidly from a completely shut-down state independently of the on-board power network of the aircraft (so-called "black start"). Furthermore the apparatus can help to increase the redundancy of the emergency systems in the aircraft. In principle, as a result of its failure safety, the apparatus can completely take over the emergency power supply in critical flight phases so that the conventional emergency power rechargeable batteries and/or the "Ram Air Turbines" become superfluous.

It is furthermore feasible to use an electric generator driven by a landing gear wheel for electrolysis of pure water where the hydrogen and the oxygen formed are collected in respectively separate containers which together form the energy storage system and are optionally compressed. For the autonomous rolling operation of the aircraft independent of the engines, the hydrogen and the oxygen are brought together again in a fuel cell and converted back into electrical energy. An electric motor located on a landing gear wheel is then driven again by means of the electrical energy which enables the desired movement of the aircraft.

The method according to the invention primarily aims at operating the apparatus or its individual components without external interventions so that an autonomous maneuvering of an aircraft fitted with the apparatus independent of the engines is possible after landing and braking on the taxiway.

In order to achieve this aim, in process step a) the kinetic energy to be dissipated during landing of the aircraft is transformed into pneumatic energy, e.g. by means of the air compressor 10, which is stored in the compressed air container 12 in process step b). The air compressor 10 is preferably coupled to a wheel of a double wheel of the nose landing gear and/or main landing gear. After the speed of the aircraft has been largely reduced on the taxiway, in process step c) the compressed air held in readiness in the compressed air container 12 can be let into an air motor 14 or an air turbine in a controlled fashion, which is used to drive at least one further wheel of the nose landing gear and/or main landing gear. The triggering and/or regulation of the components inside the apparatus according to the invention thus enables an autonomous maneuvering of the aircraft over the taxiway independent of the engines. All the process steps are controlled, regulated and monitored here by the energy management system already mentioned previously.

REFERENCE LIST

10. Air compressor (compressor)
12. Compressed air container
14. Air motor (air turbine)
16. Heat exchanger
18. System components (aircraft)
20. Outside air (ambient air)
22. Pneumatic interface
24. Fuel mixing chamber 26. Fuel tank
28. Thermal storage system
30. Drive unit
32. Electric generator
34. Electric interface

The invention claimed is:

1. An apparatus for recovering kinetic energy released during landing of an aircraft after contact with the ground, for ground or flight operation comprising at least one energy converter for conversion of the kinetic energy into another energy form, where the energy converter is configured to be located in the area of the nose landing gear or in the area of the main landing gear of the aircraft, wherein at least one energy storage system is provided for receiving and releasing at least a part of the converted kinetic energy, wherein the energy storage system is formed with at least one compressed air container, wherein the at least one energy converter is formed with at least one air compressor, wherein at least one heat exchanger is disposed between the air compressor and the compressed air container, and wherein at least one thermal storage system is provided.

2. The apparatus according to claim 1, wherein at least one further energy converter is formed with at least one air motor or with at least one air turbine.

3. The apparatus according to claim 2, wherein in that at least one fuel mixing chamber is disposed between the compressed air container and the air motor or the air turbine.

4. The apparatus according to claim 3, wherein located downstream of the fuel mixing chamber is a drive unit which drives an electrical generator.

5. The apparatus according to claim 2, wherein an electrical generator is connected directly to the air motor or the air turbine.

6. The apparatus according to claim 1, wherein the energy storage system is formed with at least one electrical rechargeable battery.

7. The apparatus according to claim 6, wherein the at least one energy converter is formed with at least one electrical generator.

8. The apparatus according to claim 7, wherein at least one further energy converter is formed with at least one electric motor.

9. The apparatus according to claim 1, wherein the energy storage system is configured to be filled via a storage system interface in ground operation.

* * * * *